(12) United States Patent
Vasudeva et al.

(10) Patent No.: US 10,427,670 B2
(45) Date of Patent: Oct. 1, 2019

(54) SUPPLEMENTAL HYDRAULIC MOTOR FOR CONTINUOUSLY VARIABLE TRANSMISSION

(71) Applicant: Caterpillar Inc., Deerfield, IL (US)

(72) Inventors: Gaurav Vasudeva, Dunlap, IL (US); Konrad Garrett, Pekin, IL (US); Justin R. Bailey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/130,639

(22) Filed: Sep. 13, 2018

(65) Prior Publication Data

US 2019/0009772 A1    Jan. 10, 2019

Related U.S. Application Data

(63) Continuation of application No. 14/962,001, filed on Dec. 8, 2015, now Pat. No. 10,093,302.

(51) Int. Cl.

| *F16H 47/04* | (2006.01) |
|---|---|
| *B60W 20/10* | (2016.01) |
| *B60W 10/04* | (2006.01) |
| *F16H 61/421* | (2010.01) |
| *B60K 6/12* | (2006.01) |

(Continued)

(52) U.S. Cl.
CPC .............. *B60W 20/10* (2013.01); *B60K 6/12* (2013.01); *B60K 6/543* (2013.01); *B60W 10/04* (2013.01); *B60W 10/101* (2013.01); *B60W 10/103* (2013.01); *B60W 10/20* (2013.01); *F16H 47/04* (2013.01); *F16H 61/421* (2013.01); *B60W 2300/17* (2013.01); *B60W 2710/09* (2013.01); *B60W 2710/105* (2013.01); *B60Y 2400/72* (2013.01); *F16H 61/44* (2013.01); *F16H 2047/045* (2013.01); *Y02T 10/6208* (2013.01); *Y02T 10/6282* (2013.01); *Y10S 903/918* (2013.01)

(58) Field of Classification Search
CPC ............................. F16H 47/04; F16H 47/045
See application file for complete search history.

(56) References Cited

U.S. PATENT DOCUMENTS

| 808,131 A | 12/1905 | Wiesenfeld |
|---|---|---|
| 3,496,803 A | 2/1970 | Whelahan |

(Continued)

FOREIGN PATENT DOCUMENTS

| JP | 200791090 | 4/2007 |
|---|---|---|
| JP | 2010058645 | 3/2010 |

*Primary Examiner* — Tisha D Lewis

(74) *Attorney, Agent, or Firm* — Miller, Matthias & Hull

(57) ABSTRACT

A continuously variable transmission includes two planetary gear sets having two planetary outputs and a planetary output shaft with a first drive gear. A variator drives a ring gear of the second planetary gear set, and a transmission input shaft is driven by the engine, which also drives the variator and the planetary input. Forward and reverse output systems are connected to the planetary output shaft and a transmission output shaft. A first clutch connects the first planetary output to the first drive gear, and a second clutch connects the second planetary output to the first drive gear. A third clutch connects the second planetary output to a second drive gear of the planetary output shaft, with the second drive gear being connected to the forward output system.

20 Claims, 4 Drawing Sheets

(51) Int. Cl.
  *B60W 10/103*   (2012.01)
  *B60W 10/20*    (2006.01)
  *B60K 6/543*    (2007.10)
  *B60W 10/101*   (2012.01)
  *F16H 61/44*        (2006.01)

(56) References Cited

U.S. PATENT DOCUMENTS

| | | | |
|---|---|---|---|
| 3,503,278 A | | 3/1970 | Livezey |
| 3,545,303 A | | 12/1970 | Whelahan |
| 5,080,637 A | * | 1/1992 | Tenberge ............... F16H 47/04 475/219 |
| 5,159,855 A | * | 11/1992 | Nikolaus ................ F16H 47/04 475/78 |
| 5,166,877 A | | 11/1992 | Ishikawa et al. |
| 5,890,981 A | * | 4/1999 | Coutant ................. F16H 47/04 475/72 |
| 5,980,411 A | * | 11/1999 | Wontner ................ F16H 47/04 475/76 |
| 6,336,518 B1 | | 1/2002 | Matsuyama |
| 7,070,531 B2 | | 7/2006 | Ishizaki |
| 8,452,500 B1 | * | 5/2013 | Seipold .................. F16H 47/04 475/204 |
| 8,758,181 B2 | * | 6/2014 | Calvert .................. F16H 47/04 475/73 |
| 2005/0054469 A1 | | 3/2005 | Dyck et al. |
| 2010/0065358 A1 | | 3/2010 | Harris |
| 2016/0047449 A1 | * | 2/2016 | Vasudeva ............... F16H 47/04 475/31 |
| 2017/0158187 A1 | | 1/2017 | Calvert et al. |

\* cited by examiner

SUPPLEMENTAL HYDRAULIC MOTOR FOR CONTINUOUSLY VARIABLE TRANSMISSION

CROSS-REFERENCE TO RELATED APPLICATION

This application is a continuation of, and claims priority under 35 U.S.C. § 120 to, previously-filed application U.S. Ser. No. 14/962,001, filed Dec. 8, 2015.

TECHNICAL FIELD

This disclosure relates generally to a system and method for increasing torque in a continuously variable transmission.

BACKGROUND

Construction and other industrial machines often include a parallel path variator transmission, which provides a continuously variable output. Variators can have pressure limits that affect peak power, torque, and rimpull. In order to increase performance across the various parameters multiple variators may be utilized. But multiple variators can add significant system costs.

SUMMARY

In one aspect of the present disclosure, a machine powertrain that includes a power source connected to a continuously variable transmission is disclosed. The continuously variable transmission includes a transmission input shaft driven by the power source, a variator including a variator input driven by the transmission input shaft, a variable displacement motor, and a variator output driven by the variable displacement motor, and a planetary gear arrangement having first planetary gear set and a second planetary gear set. The first planetary gear set has a first planetary gear arrangement input connected to a first planet carrier and a first ring gear connected to a second planet carrier of the second planetary gear set, and the second planetary gear set has a second ring gear connected to a second planetary gear arrangement input, wherein the first planetary gear arrangement input is driven by the transmission input shaft and the second planetary gear arrangement input is driven by the variator output. The continuously variable transmission further includes a planetary output shaft having a first planetary output, and a forward output system having a first forward drive gear operatively coupled to the first planetary output, and a forward output gear operatively connected to a transmission output shaft. The continuously variable transmission also includes a first clutch connected to the second planet carrier and configured to releasably engage the planetary output shaft to cause the first planetary output to rotate with the second planet carrier, a second clutch connected to the first planetary output and configured to releasably engage a sun gear shaft of the planetary output shaft connected to a second sun gear of the second planetary gear set to cause the first planetary output to rotate with the second sun gear, and a forward clutch connected to the first forward drive gear and configured to releasably engage the forward output gear to cause the forward output gear to rotate with the first forward drive gear. The first clutch and the forward clutch are engaged to provide a first forward-motion gear ratio between the transmission input shaft and the transmission output shaft, and the second clutch and the forward clutch are engaged to provide a second forward-motion gear ratio between the transmission input shaft and the transmission output shaft.

In a further aspect of the present disclosure, a machine powertrain that includes a power source connected to a continuously variable transmission is disclosed. The continuously variable transmission includes a transmission input shaft driven by the power source, a variator including a variator input gear driven by the transmission input shaft and a variator output gear, and a planetary gear arrangement having first planetary gear set connected to a second planetary gear set. The first planetary gear set has a first planetary gear arrangement input gear and the second planetary gear set has a second planetary gear arrangement input gear, with the first planetary gear arrangement input gear being driven by the transmission input shaft and the second planetary gear arrangement input gear being driven by the variator output gear. The continuously variable transmission further includes a planetary output shaft having a first planetary output gear, and a forward output system having a first forward drive gear operatively coupled to the first planetary output gear, and a forward output gear operatively connected to a transmission output shaft. The continuously variable transmission also includes a first clutch connected to a second planet carrier of the second planetary gear set, a second clutch connected to the first planetary output gear, a forward clutch connected to the first forward drive gear, and a controller operatively connected to the variator, the first clutch, the second clutch and the forward clutch. The controller is programmed to actuate the first clutch to cause the first planetary output gear to rotate with the second planet carrier and actuate the forward clutch to cause the forward output gear to rotate with the first forward drive gear and provide a first forward-motion gear ratio between the transmission input shaft and the transmission output shaft, and actuate the second clutch to cause the first planetary output gear to rotate with a second sun gear of the second planetary gear set and actuate the forward clutch to cause the forward output gear to rotate with the first forward drive gear and provide a second forward-motion gear ratio between the transmission input shaft and the transmission output shaft.

In another aspect of the present disclosure, a method for providing a plurality of gear ratios between a transmission input shaft and a transmission output shaft of a continuously variable transmission of a machine powertrain is disclosed. The machine power train includes a power source, the continuously variable transmission including a variator with a variator input gear driven by the transmission input shaft and a variator output gear, a planetary gear arrangement having first planetary gear set connected to a second planetary gear set, with the first planetary gear set having a first planetary gear arrangement input gear and the second planetary gear set having a second planetary gear arrangement input gear. The first planetary gear arrangement input gear is driven by the transmission input shaft and the second planetary gear arrangement input gear is driven by the variator output gear, a planetary output shaft having a first planetary output gear, and a forward output system having a first forward drive gear operatively coupled to the first planetary output gear and a forward output gear operatively connected to the transmission output shaft. The method includes actuating a first clutch to cause the first planetary output gear to rotate with a second planet carrier of the second planetary gear set and actuating a forward clutch to cause the forward output gear to rotate with the first forward drive gear and provide a first forward-motion gear ratio between the transmission input shaft and the transmission output shaft, and actuating a second clutch to cause the first planetary output gear to rotate with a second sun gear of the second planetary gear set and actuating the forward clutch to cause the forward output gear to rotate with the first forward drive gear and provide a second forward-motion gear ratio between the transmission input shaft and the transmission output shaft.

DETAILED DESCRIPTION

This disclosure generally relates to systems that utilize a continuously variable transmission to connect a power source to ground-engaging equipment (e.g., wheels). These systems include various types of machines, such as machines used for mining, construction, farming, transportation, and the like. Exemplary machines include a wheel loader (or other type of loader), excavator, dump truck, backhoe, motor grader, material handler, and the like.

Generally, an aspect of the present disclosure increases torque of the continuously variable transmission by utilizing a supplemental motor. The supplemental hydraulic motor is connected to an output of the continuously variable transmission and is powered by a hydraulic steering pump. In addition, the supplemental hydraulic motor may be ground-driven by way of the transmission output to provide a secondary hydraulic steering pump. In a further aspect, the supplemental hydraulic motor may provide a transmission-retarding functionality.

Figure 1:
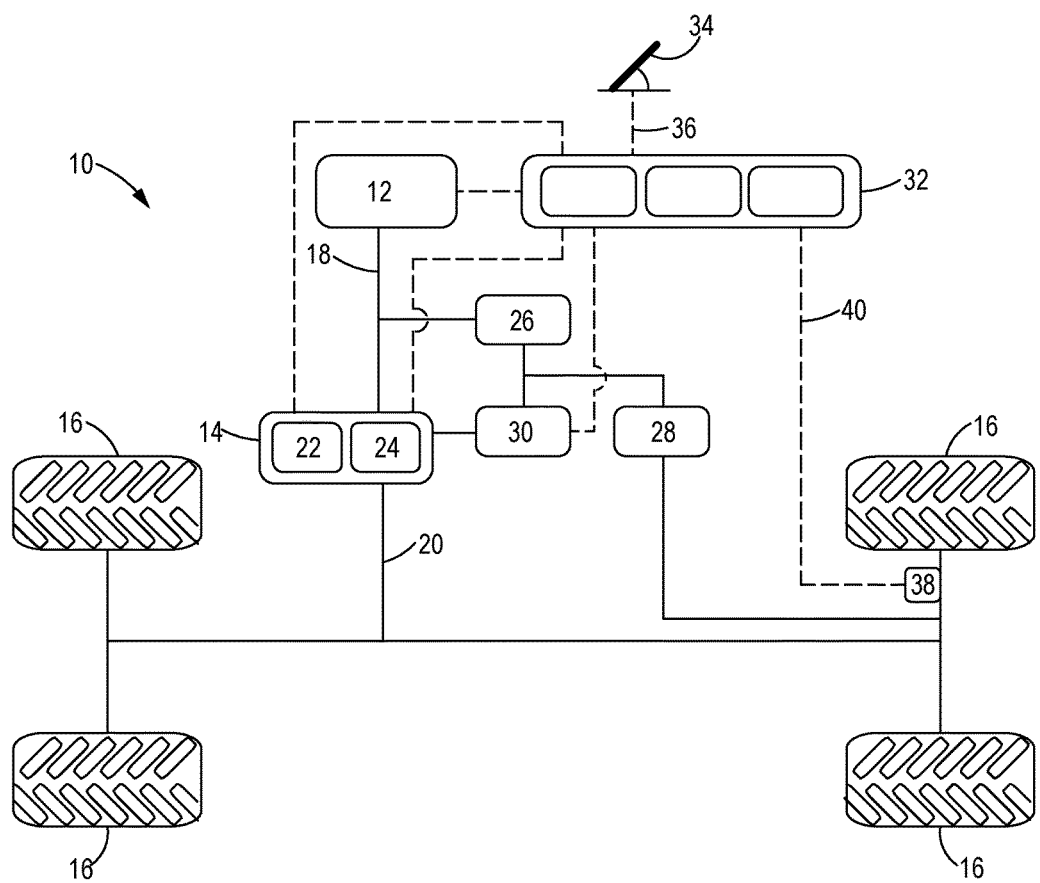
FIG. 1 includes a schematic diagram of a machine in accordance with an aspect described in the present disclosure.

Referring to FIG. 1, a schematic diagram of a machine 10 is provided. The machine 10 includes a primary power source 12, such as an internal combustion engine (e.g., diesel engine, gasoline engine, and gaseous-fuel driven engine), an electric motor, or other source of rotational power. In addition, the machine 10 includes a transmission 14 that links the primary power source 12 to ground-engaging members, which are illustratively depicted as wheels 16.

At a high level, the primary power source 12 provides a rotational input 18 to the transmission 14, which converts the rotational input 18 into a rotational output 20 used to rotate the wheels 16. For instance, the rotational output 20 may be provided in a forward direction or reverse direction and may be further controlled using a set of gears within the transmission 14. The transmission 14 is a continuously variable transmission having a variator 22 and a mechanical transmission 24, the variator 22 varying the overall ratio of the mechanical transmission 24. The rotational output 20 may be transferred to the wheels 16 using various systems, such as by using a splitter that transfers the rotational output 20 to a drive shaft for each axle. Each drive shaft may then provide power to a respective axle by way of a respective differential. The machine 10 includes other components that receive the rotational input 18 provided by the primary power source 12. For instance, as previously indicated, the machine 10 includes the variator 22 that receives a portion of the rotational input 18. In addition, the machine 10 includes a hydraulic steering pump 26 that receives a portion of the rotational input and that is fluidly coupled to a hydraulic steering system 28.

The variator 22 may include a variable-displacement hydraulic pump that is fluidly interconnected with, and arranged to operate, a hydraulic motor (e.g., variable displacement hydraulic motor). As such, the variator 22 may have pressure limits that affect peak power, torque, and rimpull of the machine 10. In accordance with an aspect of the present disclosure, the machine 10 includes a supplemental hydraulic motor 30 that is coupled to the transmission 14 (e.g., to the output gears of the transmission) and that is hydraulically powered by the hydraulic steering pump 26. The supplemental hydraulic motor 30 may be selectively engaged to increase a torque of the rotational output 20.

These various components of FIG. 1 are described in a context of using a primary power source 12 to rotate ground-engaging equipment by way of a transmission 14. The machine 10 may also include a ground-driven operational state in which the ground-engaging equipment may provide a rotational input back to the transmission 14, such as when the machine is coasting downhill. In another aspect of the present disclosure, the supplemental hydraulic motor 30 is usable as secondary, ground-driven hydraulic steering pump (i.e., in a ground-driven operational state) that is useable to provide fluid to the hydraulic steering system 28 in the event that the hydraulic steering pump 26 (i.e., primary hydraulic steering pump) is providing insufficient flow (e.g., low pressure). Furthermore, the supplemental hydraulic motor 30 may be used as a transmission retarder to help diffuse the ground-driven rotational force provided to the transmission, as is described in other portions of this disclosure.

The machine 10 includes various controls and sensors that help to regulate operation of the machine 10. For instance, the machine 10 includes a controller 32 that is electrically and electronically coupled to various components of the machine 10. The controller monitors and controls the function of various systems within the machine 10, such as by receiving and monitoring sensor readings provided by various sensors and by transmitting commands to various components to adjust engine speed, load output, and other operations. The controller 32 may be an electronic control module and may include one or more processors or microprocessors, a memory, a data storage device, a communications hub, and the like. The controller 32 is configured to send and receive signals from various components of the machine in any signal format, such as including a current or a voltage level.

As depicted in FIG. 1, the controller 32 may receive inputs or signals from various sources. Sometimes, these inputs trigger an output or command from the controller 32 to another component. For example, the controller 32 receives signals from an accelerator-pedal sensor 34 by way of a throttle communication channel 36. As such, the manipulation of the accelerator pedal (e.g., by an operator) transmits one or more signals to the controller 32 indicating a desired ground speed of the machine 10 or an amount of torque requested against a ground surface. In addition, the controller 32 receives ground-speed information from a ground-speed sensor 38 by way of ground-speed communication channel 40. Based on the signal(s) received from at least the accelerator-pedal sensor 34 and the ground-speed sensor 38 (and possibly from other sources), the controller 32 may transmit commands to the primary power source 12, to the transmission 14, to the variator 22, or to the supplemental hydraulic motor 30 in order to adjust an operation of the machine. This is merely one example of the controller 32 receiving one or more inputs and transmitting one or more commands to adjust an operation of the machine 10. Other functions of the controller 32 are described in other portions of this disclosure.

Figure 2:
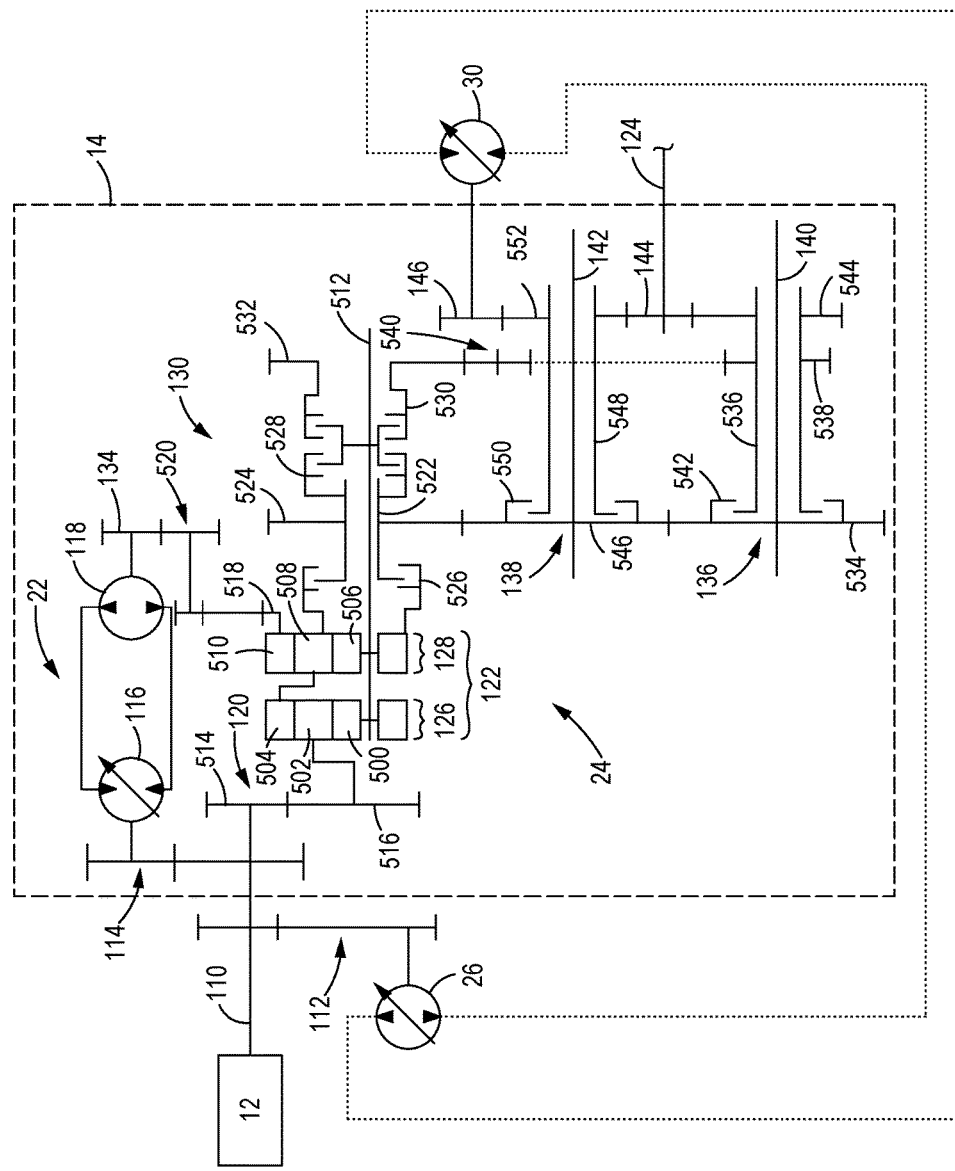
FIG. 2 provides a diagram of a transmission in accordance with the present disclosure.

In FIG. 2 a schematic diagram illustrates some additional details of the transmission 14, the variator 22, the mechanical transmission 24, the hydraulic steering pump 26, and the supplemental hydraulic motor 30 in accordance with an aspect of the present disclosure. An input shaft 110 provides a rotational input, such as the rotational input 18 described with respect to FIG. 1. The input shaft 110 includes a steering-pump input gear set 112 connected to the hydraulic steering pump 26. The input shaft 110 is also connected to a variator input gear set 114 that drives a variator 22, which in the illustrated embodiment includes a variable-displacement hydraulic pump 116 that is fluidly interconnected with and arranged to operate a variable-displacement hydraulic motor 118. The input shaft 110 is also connected to a mechanical-transmission input gear 120. As such, the rotational input provided to the transmission 14, can be split into power provided to the variator 22 and to a mechanical transmission 24.

The mechanical transmission 24 includes a planetary gear arrangement 122 that is mechanically coupled to an output shaft 124 by way of a series of various gears, shafts, sleeves, clutches, and other components. The planetary gear arrangement 122 includes a first axially aligned planetary gear set 126 and second axially aligned planetary gear set 128, as well as a planetary output shaft 130. The first planetary gear set 126 includes a first sun gear 500, a first planet carrier 502 and a first ring gear 504. The second planetary gear set 128 includes a second sun gear 506, a second planet carrier 508 and a second ring gear 510. The first ring gear 504 is connected to the second planet carrier 508 for rotation together, and a sun gear shaft, such as an internal shaft 512 of the planetary output shaft 130, is connected to the sun gears 500, 506 for rotation together. A first input to the planetary gear arrangement 122 is provided by a mechanical transmission input gear 514 mounted on the input shaft 110 and meshing with a first planetary gear arrangement input gear 516 connected to the first planet carrier 502. A second input to the planetary gear arrangement 122 is provided by the variator output gear 134. A second planetary gear arrangement input gear 518 is connected to the second ring gear 510, and a first intermediate gear set 520 connects the variator output gear 134 to the second planetary gear arrangement input gear 518 such that the second ring gear 510 receives the variator rotational output.

The planetary output shaft 130 includes the internal shaft 512 and an output shaft sleeve 522. The output shaft sleeve 522 is disposed in axial alignment over a portion of the internal shaft 512 and can be embodied as a hollow shaft or hub that is supported by the internal shaft 512. The internal shaft 512 is connected to the sun gears 500, 506 of the planetary gear sets 126, 128, respectively, as discussed above. A first planetary output gear 524 is mounted on the output shaft sleeve 522 so that the output shaft sleeve 522 and the first planetary output gear 524 will rotate together. During operation, power from the input shaft 110 directly and/or through the variator 22, which is selectively subjected to an appropriate gear ratio through the planetary gear arrangement 122, is provided to the output shaft 124 by selective engagement of at least one of three clutches associated with the planetary output shaft 130. A first or low clutch 526 is connected to the second planet carrier 508 and is configured to engage and power the output shaft sleeve 522 such that, when the first clutch 526 is engaged, rotation of the second planet carrier 508 is transferred to the first planetary output gear 524. A second or high clutch 528 is connected to the output shaft sleeve 522 and is associated with the internal shaft 512 so that, when engaged, rotation of the sun gears 500, 506 is transferred to the first planetary output gear 524. A third or auxiliary clutch 530 is disposed in axial alignment over a portion of the internal shaft 512 and is connected to a second planetary output gear 532 that is also disposed on and rotatable about the internal shaft 512. When the third clutch 530 is engaged, rotation of the sun gears 500, 506 is transferred via the third clutch 530 to the second planetary output gear 532.

The planetary gear arrangement 122 and the variator 22 provide a rotational output to the planetary output shaft 130, which transfers the rotational output to a forward output system 136 via the first planetary output gear 524 or the second planetary output gear 532 via the reverse output system 138, or to a reverse output system 138 via the first planetary output gear 524. The forward output system 136 includes a forward output member 140, and the reverse output system 138 includes a reverse output member 142. Both the forward output member 140 and the reverse output member 142 are coupled to a transmission output gear set 144, which couples the forward output member 140 and the reverse output member 142 to the output shaft 124. The forward output member 140 provides a driving motion in the forward machine travel direction, and the reverse output member 142 provides a driving motion in the reverse machine travel direction. In the forward output system 136, a first forward drive gear 534 is mounted on the forward output member 140 for rotation therewith. The first forward drive gear 534 is operatively connected to the first planetary output gear 524 so that output rotation of the planetary output shaft 130 is converted into rotation of the first forward drive gear 534 when either the first clutch 526 or the second clutch 528 is engaged as discussed further below. A forward drive sleeve 536 is disposed in axial alignment over a portion of the forward output member 140 and can be embodied as a hollow shaft or hub that is supported by the forward output member 140. A second forward drive gear 538 is mounted on the forward drive sleeve 536 and is operatively connected to the second planetary output gear 532 by a second intermediate gear set 540 so that output rotation of the planetary output shaft 130 is converted into rotation of the second forward drive gear 538 and the forward drive sleeve 536 when the third clutch 530 is engaged. A fourth or forward clutch 542 is connected to the first forward drive gear 534 and is configured to engage and power the forward drive sleeve 536 such that, when the fourth clutch 542 is engaged, rotation of the first forward drive gear 534 is transferred to the forward drive sleeve 536. A forward output gear 544 is mounted on the forward drive sleeve 536 and meshes with the transmission output gear set 144 so that rotation of the forward drive sleeve 536 is converted into rotation of the output shaft 124 in the forward direction.

The reverse output system 138 includes a reverse drive gear 546 mounted on the reverse output member 142 for rotation therewith. In the illustrated embodiment, the reverse drive gear 546 meshes with the first planetary output gear 524 and the first forward drive gear 534. Output rotation of the planetary output shaft 130 when either the first clutch 526 or the second clutch 528 is engaged is converted into rotation of the reverse drive gear 546 and the reverse output member 142 in one direction, and rotation of the first forward drive gear 534 and the forward output member 140 in the opposite direction via the reverse drive gear 546. A reverse drive sleeve 548 is disposed in axial alignment over a portion of the reverse output member 142 and can be embodied as a hollow shaft or hub that is supported by the reverse output member 142. A fifth or reverse clutch 550 is connected to reverse drive gear 546 and is configured to engage and power the reverse drive sleeve 548 such that, when the fifth clutch 550 is engaged, rotation of the reverse drive gear 546 is transferred to the reverse drive sleeve 548. A reverse output gear 552 is mounted on the reverse drive sleeve 548 and meshes with the transmission output gear set 144 so that rotation of the reverse drive sleeve 548 is converted into rotation of the output shaft 124 in the reverse direction. In the embodiment shown, each of the five clutches 526, 528, 530, 542, 550 can include a clutch pack or, stated differently, a plurality of clutch disks, that can be selectively engaged by action of a dedicated actuator that is responsive to control signals from a transmission controller such as the controller 32 (FIG. 1). The arrangement of the transmission 14 illustrated in FIG. 2 is exemplary, and various other transmission arrangements may be utilized in other aspects of the disclosure.

Based on the foregoing, the illustrated embodiment for the transmission 14 is capable of providing three forward and two reverse gear ratios for motion, as illustrated in Table 1 below, depending on which clutches are engaged:

TABLE 1

| Direction | Speed | First (Low) Clutch 526 | Second (High) Clutch 528 | Third (Aux) Clutch 530 | Fourth (Forward) Clutch 542 | Fifth (Reverse) Clutch 550 |
|---|---|---|---|---|---|---|
| Forward | Low | ON | off | off | ON | off |
|  | High | off | ON | off | ON | off |
|  | Auxiliary | off | ON/off | ON | off/ON | off |
| Reverse | Low | ON | off | off | off | ON |
|  | High | off | ON | off | off | ON |

The five clutches 526, 528, 530, 542, 550 are engaged in combinations to provide particular combinations of speed and direction of travel of the machine 10. As can be seen from Table 1, except for the "Auxiliary" forward motion, each gear ratio requires the engagement of either the first or low clutch 526 or the second or high clutch 528 to set the low or high gear ratio, and the engagement of either the fourth or forward clutch 542 or the fifth or reverse clutch 550 to set the direction of travel of the machine 10. In the forward low gear, the first clutch 526 is engaged so that the first ring gear 504 and the second planet carrier 508 rotate the output shaft sleeve 522 and the first planetary output gear 524, and the fourth clutch 542 is engaged so that the forward drive sleeve 536 and the forward output gear 544 rotate with the first forward drive gear 534. The fifth clutch 550 is disengaged and the reverse drive gear 546 functions as an idler transferring rotation and power from the first planetary output gear 524 to the first forward drive gear 534. The transmission 14 shifts from low gear to high gear by disengaging the first clutch 526 and engaging the second clutch 528 so that the sun gears 500, 506 rotate the output shaft sleeve 522 and the first planetary output gear 524. To shift to the auxiliary forward gear, it is necessary to cease the transmission of rotation and power from the first planetary output gear 524 to the first forward drive gear 534. In some embodiments, both the second clutch 528 and the fourth clutch 542 can be disengaged to isolate the first forward drive gear 534 from the first planetary output gear 524. In alternate embodiments such as that shown in Table 1, one of the clutches 528, 542 is disengaged while the other of the clutches 528, 542 remains engaged. By leaving one clutch 528, 542 engaged, downshifting from the auxiliary forward gear to the high forward requires the reengagement of only one of the clutches 528, 542, thereby facilitating a smoother transition in the downshift. Once one or both of the clutches 528, 542 are disengaged, the third clutch 530 is engaged so that the sun gears 500, 506 and the second planetary output gear 532 rotate the second forward drive gear 538 and the forward output gear 544. The reverse low and high gears are executed in a similar manner as the forward low and high gears as described above, except with the fourth clutch 542 disengaged and the fifth clutch 550 engaged so that the reverse drive sleeve 548 and the reverse output gear 552 rotate with the reverse drive gear 546 and the output shaft 124 rotates in the reverse direction.

In operation, the input shaft 110 delivers split input power to the variator 22 and to the planetary gear arrangement 122. A hydro-mechanical output power is provided for application to a load, such as one or more driving wheels (e.g., FIG. 1, wheels 16) of a machine. The speed and torque in each of the power ranges initially set by gear ratios of the planetary gear arrangement 122 is variable by varying the stroke of the hydraulic pump 116 of the variator 22.

As previously explained, the variator 22 can have pressure limits that may affect peak power, torque, and rimpull. As such, an aspect of the disclosure includes a supplemental hydraulic motor 30 (e.g., variable-displacement hydraulic motor) that is coupled to the transmission output gear set 144. For example, the supplemental hydraulic motor 30 may be coupled to the transmission output gear set 144 by way of a supplemental-motor output gear 146 that is meshed with the transmission output gear set 144. The supplemental hydraulic motor 30 is hydraulically powered by the hydraulic steering pump 26 and is selectively engageable to apply additional torque to the transmission output gear set 144. For example, the supplemental hydraulic motor 30 may be manually actuated by an operator by manually engaging a switch. In addition, the supplemental hydraulic motor 30 may be automatically actuated by the controller when the controller determines that additional torque is needed. These and other aspects of the supplemental hydraulic motor 30 will be further described with respect to FIG. 3.

Figure 3:
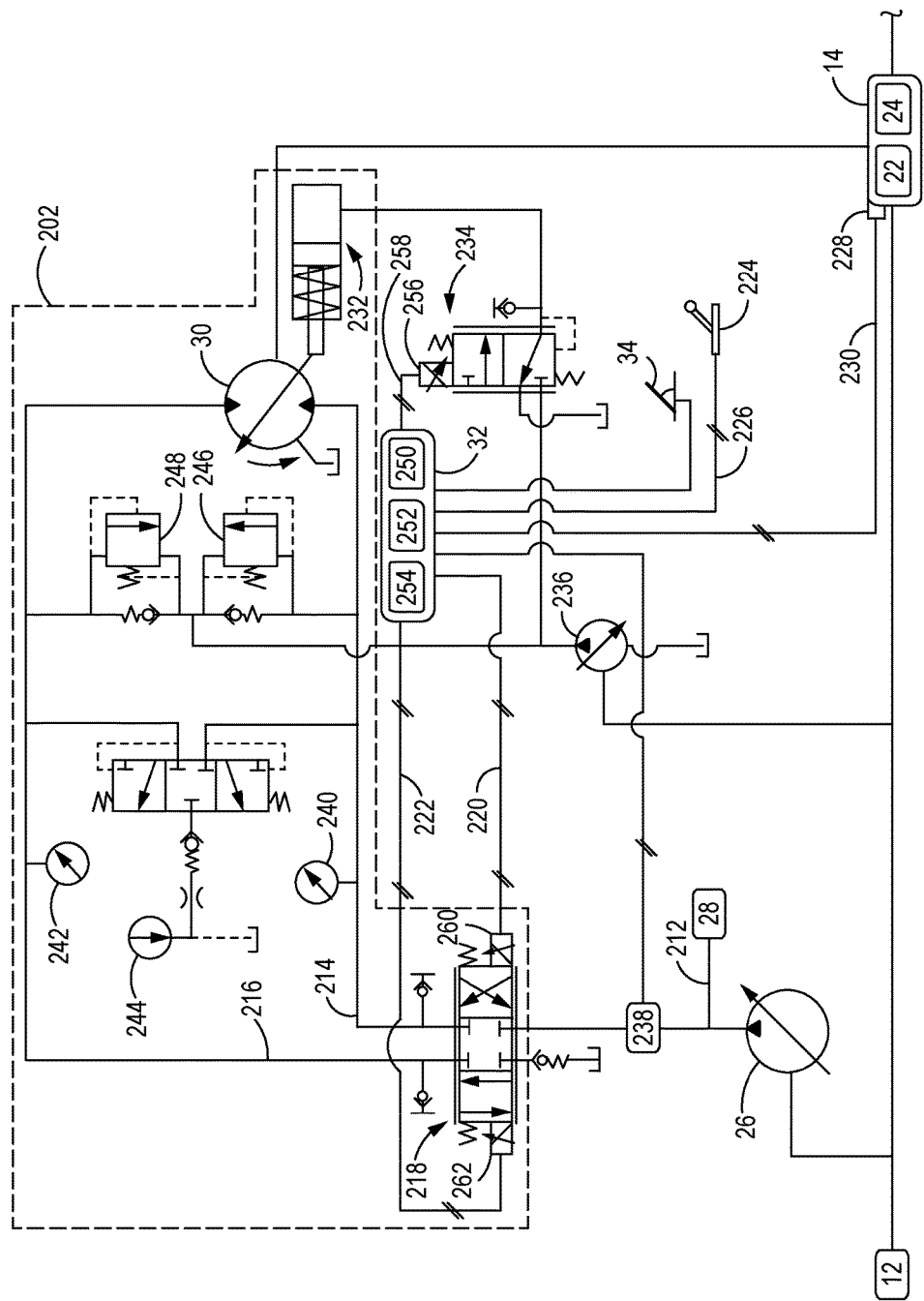
FIG. 3 provides a schematic illustration of at least part of a hydraulic circuit in accordance with the present disclosure.

FIG. 3 provides a diagram of components that are linked mechanically, hydraulically, and/or electronically and that might be used to operate the supplemental hydraulic motor 30 in accordance with an aspect of this disclosure. Generally, FIG. 3 includes the primary power source 12 coupled to the transmission 14 and the hydraulic steering pump 26, such as in the exemplary manner described with respect to FIG. 2. In addition, the hydraulic steering pump 26 is hydraulically coupled to the hydraulic steering system 28 by a first set of fluid lines 212 and to the supplemental hydraulic motor 30 by a second set of fluid lines 214 and 216. Further, the supplemental hydraulic motor 30 is coupled to the output of the transmission 14 in order to selectively increase torque. Several of the components illustrated in FIG. 3 are connected to the controller 32 by way of various communication links.

In accordance with an aspect of the present disclosure, a valve 218 is coupled to the second set of fluid lines 214 and 216 and between the hydraulic steering pump 26 and the supplemental hydraulic motor 30. In an aspect of the present disclosure, the valve 218 includes a directional control valve that can allow flow to pass from the hydraulic steering pump 26 to the supplemental hydraulic motor 30, as well as from the supplemental hydraulic motor 30 to the hydraulic steering system 28. In addition, the valve 218 can selectively allow flow in either of lines 214 or 216. The supplemental hydraulic motor 30, the valve 218, and the fluid lines 214 and 216 are illustrated within a broken-line box to illustratively convey that these components may be part of a hydraulic circuit 202. However, the hydraulic circuit 202 may include a variety of other components not expressly described or depicted in FIG. 3.

The valve 218 includes communication links 220 and 222 that link the valve 218 to the controller 32. In accordance with an aspect of the present disclosure, the controller 32 controls an operation of the valve 218 by sending signals to the valve 218 by way of the communication links 220 and 222. The valve 218 depicted in FIG. 3 includes solenoids 260 and 262 that can be actuated by a signal from the controller 32, and other electronic controls may also be used. For instance, the controller 32 may receive an input or signal from a lever, button, or other manually activatable switch 224 that can be manually selected by an operator and that transmits input to the controller 32 by way of a communication link 226. In response to the signal from the switch 224, the controller 32 may send a signal to the valve 218 (e.g., to the solenoid) to move between an opened state and blocked state to configure the various ports based on a desired functionality (e.g., allow flow to supplemental hydraulic motor 30 or allow flow to tank).

In another aspect, the controller 32 may automatically control an operation of the valve 218 by sending one or more signals to the valve 218 in response to one or more machine operating parameters that are detected or measured by sensors. For example, the controller includes a torque module 250 that processes the various machine operating parameters to determine additional torque is being requested or would improve machine performance. For example, the torque module 250 may receive input from one or more transmission sensors 228 that measure or detect an operational status of the transmission 14 and that transmit the signals to the controller 32 by way of a communication link 230. In addition, the torque module 250 may receive input from the accelerator-pedal sensor 34 and the ground-speed sensor 38, as described with respect to FIG. 1. The torque module 250 may apply an algorithm to the one or more machine operating parameters to determine when the supplemental hydraulic motor should be actuated to increase torque provided to the output gear set.

Once the valve 218 is opened to allow flow from the hydraulic steering pump 26 to the supplemental hydraulic motor 30, the supplemental hydraulic motor 30 is powered and can increase the torque to the transmission (i.e., to the output gear set). As depicted in FIG. 3, the supplemental hydraulic motor 30 is a variable displacement hydraulic motor. As such, a hydraulic actuator 232 is coupled to the supplemental hydraulic motor 30 to control an amount of displacement. For instance, once additional torque is no longer requested, then the valve 218 may be closed, and the hydraulic actuator 232 may destroke the supplemental hydraulic motor 30, such that the supplemental hydraulic motor 30 is not pumping or motoring and is in a free-wheeling state.

The hydraulic actuator 232 is fluidly coupled to a charge pump 236, which may also be powered by an input from the primary power source 12. In addition, flow between the charge pump 236 and the hydraulic actuator 232 is regulated by another valve 234, which is also controlled by the controller 32 by way of a communication link 258. The other valve 234 also includes a solenoid 256, and an alternative electronic control may also be used. By controlling the valve 234, flow can either be provided from the hydraulic actuator 232 to the tank or between the hydraulic actuator 232 and the charge pump 236 to either upstroke or destroke the supplemental hydraulic motor 30. As such, by controlling the valve 234 and the hydraulic actuator 232, the torque provided to the transmission 14 can be controlled.

In a further aspect of the present disclosure, the supplemental hydraulic motor 30 can function as a secondary hydraulic steering pump if the pressure provided by the hydraulic steering pump 26 to the hydraulic steering system 28 is insufficient or fails to meet a threshold. As such, the supplemental hydraulic motor 30 that is used to increase output power can also be used to reduce costs related to a separate electric-motor-driven secondary pump or a separate ground-driven pump.

The supplemental hydraulic motor 30 may be activated as a secondary hydraulic steering pump in various manners. For example, a pressure sensor 238 measures a pressure of flow provided by the hydraulic steering pump 26, and may send the pressure measurements to the controller 32 by way of a communication link. The controller 32 may have a steering module 252 that monitors the hydraulic steering pump 26 performance, as determined through various sensors, and that compares pressure measurements to pre-determined thresholds. As such, when the pressure supplied by the hydraulic steering pump 26 is insufficient (e.g., fails to satisfy a pre-determined threshold as determined by the steering module 252), a signal can be sent from the controller 32 to the valve 218 to open the valve 218 in a certain fashion to allow flow from line 214 or line 216 and to the hydraulic steering system 28. That is, when the valve 218 is opened in this fashion and the supplemental hydraulic motor 30 is upstroked (e.g., by the hydraulic actuator 232), fluid is pumped by the supplemental hydraulic motor 30, through one of the lines 214 and 216, and to the hydraulic steering system 28.

The pump functionality of the supplemental hydraulic motor 30 is facilitated in various manners to pump fluid through either of the fluid lines 214 or 216. In an aspect of the present disclosure, the supplemental hydraulic motor 30 is powered by the transmission output, which is ground driven by ground-engaging equipment (e.g., wheels 16). In addition, the controller 32 can send a signal to the valve 234 to control a position of the hydraulic actuator 232, which regulates a stroke of the supplemental hydraulic motor 30.

In a further aspect of the present disclosure, the supplemental hydraulic motor 30 can retard the transmission 14, which may allow transmission components to be reduced in size based on smaller loads. That is, as previously described, the supplemental hydraulic motor 30 is coupled to the transmission output (e.g., to the transmission output gear set). As such, a hydraulic circuit 202 including the supplemental hydraulic motor 30 and the lines 214 and 216 and the valve 218 can be utilized to send at least part of the force provided by the ground-driven transmission output into the hydraulic circuit.

In a further aspect, the transmission-retarding operations of the supplemental hydraulic motor 30 are automatically initiated by the controller 32 based on various inputs. For example, the controller 32 may include a transmission-retarding module 254 that process one or more machine operating parameters, such as the detected ground speed, throttle demand, transmission status, engine status, or any combination thereof, to determine that retarding is desired. The controller 32 may combine the operational features of the supplemental hydraulic motor 30, the hydraulic loop, and the valve 218 to achieve a desired level of retarding. For example, an amount of displacement of the supplemental hydraulic motor 30 may be tuned (i.e., using the hydraulic actuator 232). In addition, the state of the valve 218 could be controlled to either block flow entirely, or flow could be allowed to dump to tank. Furthermore, loop pressure could be detected, such as by using pressure sensors 240 and 242, and displacement of the supplemental hydraulic motor 30 could be adjusted based on the loop pressure.

Various other controls are included in the system to help protect and control the supplemental hydraulic motor 30 and monitor the lines 214 and 216. For example, FIG. 3 includes a temperature sensor 244 that may trigger certain controls or modifications if a temperature threshold is met. In addition, pressure relief valves 246 and 248 may also be used to control the flow and the supplemental hydraulic motor 30.

Figure 4:
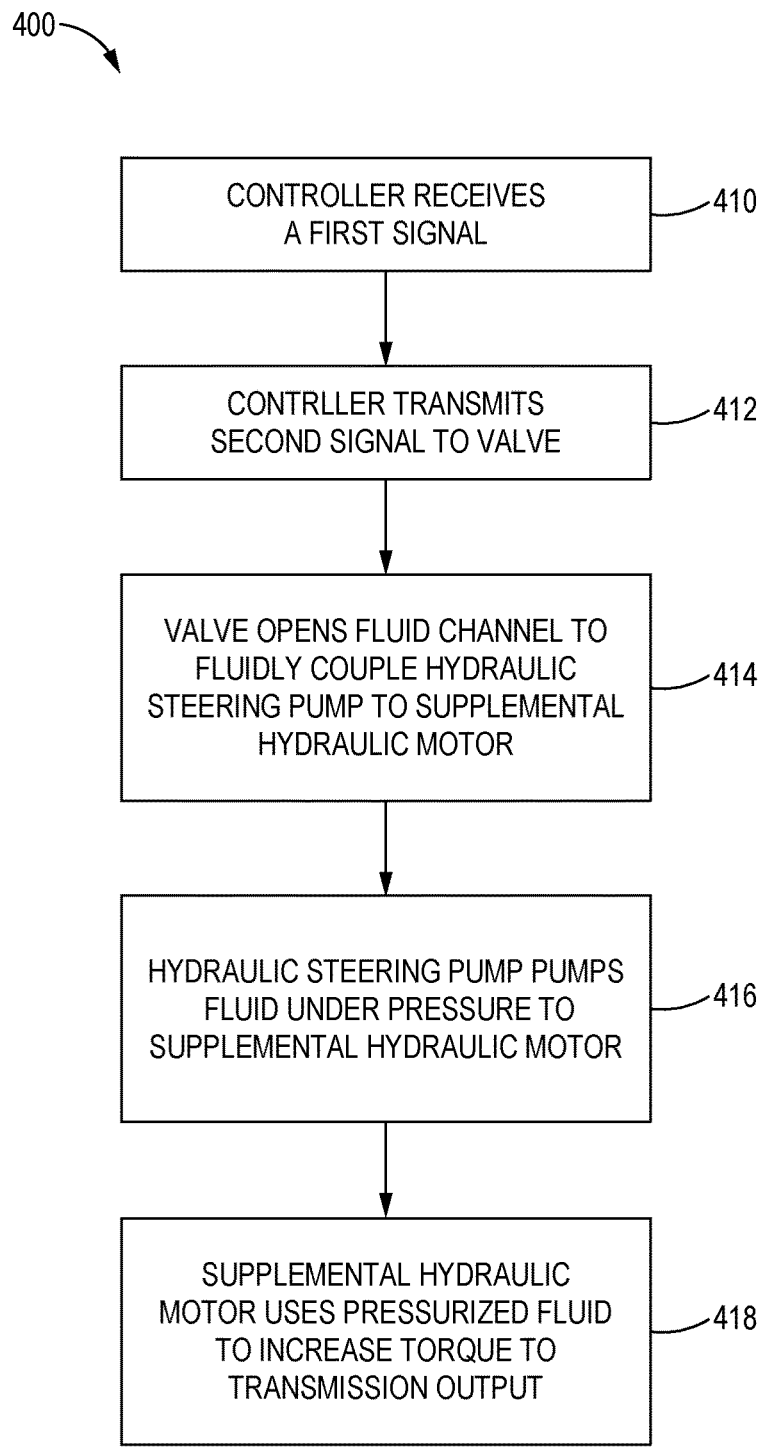
FIG. 4 provides a flow diagram outlining a method in accordance with the present disclosure.

Referring now to FIG. 4, another aspect of the present disclosure is illustrated by way of a flow chart depicting a method 400 of increasing an amount of torque provided to an output shaft of a continuously variable transmission. When describing the steps of the method, reference may also be made to elements of FIGS. 1-3 for exemplary purposes. The method 400 includes receiving (at step 410) by the controller 32 a first signal. For example, the controller 32 may receive a signal from the switch 224 or from one or more sensors 34, 38, and 228 monitoring various machine operating parameters of the machine 10. Pursuant to the method the controller 32 transmits (at step 412) a second signal to the valve 218. The controller 32 may transmit a signal along at least one of the communication links 220 or 222 to the valve 218 (or to at least one of the solenoids 260 or 262) based on the first signal. The valve opens (at step 414) a fluid channel in response to receiving the second signal, the fluid channel fluidly coupling the hydraulic steering pump 26 to the supplemental hydraulic motor 30. The fluid channel may include one of the fluid lines 214 or 216. In step 416, the hydraulic steering pump 26 pumps a hydraulic fluid under pressure through the fluid channel and to the supplemental hydraulic motor 30. In the method 400, the supplemental hydraulic motor 30 uses (in step 418) the hydraulic fluid under pressure to rotate the supplemental-motor output gear 146, which is in a meshed relationship with a transmission output gear set 144.

INDUSTRIAL APPLICABILITY

The supplemental hydraulic motor and related components for providing increased torque to a continuously variable transmission can be used in a wide variety of machines that include a hydraulic steering pump. The supplemental hydraulic motor may be engaged when additional transmission output torque or machine rimpull is requested. For example, the supplemental hydraulic motor may be manually engaged by an operator or may be automatically engaged by the controller. In addition, once the torque and rimpull is no longer requested, the displacement of the supplemental hydraulic motor may be reduced to also reduce the torque.

In addition, because the supplemental hydraulic motor is fluidly coupled with the hydraulic steering pump and the hydraulic steering system, the supplemental hydraulic motor may also function as a secondary, ground-driven hydraulic steering pump. Operation of the supplemental hydraulic motor as a secondary, ground-driven hydraulic steering pump may be automatically initiated by a pressure sensor and controller that monitor a pressure of the hydraulic steering pump (i.e., primary pump).

Furthermore, because the supplemental hydraulic motor is coupled to the transmission output, the hydraulic circuit may be utilized to retard the transmission. Transmission retarding may also be automatically initiated based on machine operating parameters that are monitored by the controller. Moreover, the amount of retarding is tunable by adjusting different variables of the hydraulic circuit, such as a displacement of the supplemental hydraulic motor, as well as a flow path of the hydraulic fluid.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

We claim:

1. A machine powertrain that includes a power source connected to a continuously variable transmission, the continuously variable transmission comprising:
    a transmission input shaft driven by the power source;
    a variator including a variator input driven by the transmission input shaft, a variable displacement motor, and a variator output driven by the variable displacement motor;
    a planetary gear arrangement having first planetary gear set and a second planetary gear set, the first planetary gear set having a first planetary gear arrangement input connected to a first planet carrier and a first ring gear connected to a second planet carrier of the second planetary gear set, and the second planetary gear set having a second ring gear connected to a second planetary gear arrangement input, wherein the first planetary gear arrangement input is driven by the transmission input shaft and the second planetary gear arrangement input is driven by the variator output;
    a planetary output shaft having a first planetary output;
    a forward output system having a first forward drive gear operatively coupled to the first planetary output, and a forward output gear operatively connected to a transmission output shaft;
    a first clutch connected to the second planet carrier and configured to releasably engage the planetary output shaft to cause the first planetary output to rotate with the second planet carrier;
    a second clutch connected to the first planetary output and configured to releasably engage a sun gear shaft of the planetary output shaft connected to a second sun gear of the second planetary gear set to cause the first planetary output to rotate with the second sun gear; and
    a forward clutch connected to the first forward drive gear and configured to releasably engage the forward output gear to cause the forward output gear to rotate with the first forward drive gear,
    wherein the first clutch and the forward clutch are engaged to provide a first forward-motion gear ratio between the transmission input shaft and the transmission output shaft, and the second clutch and the forward clutch are engaged to provide a second forward-motion gear ratio between the transmission input shaft and the transmission output shaft.

2. The machine powertrain of claim 1, wherein the planetary output shaft has a second planetary output, wherein the forward output system has a second forward drive gear connected to the forward output gear and operatively coupled to the second planetary output, and wherein the machine powertrain comprises a third clutch connected to the second planetary output and configured to releasably engage the sun gear shaft to cause the second planetary output to rotate with the second sun gear, wherein the third clutch is engaged to provide a third forward-motion gear ratio between the transmission input shaft and the transmission output shaft.

3. The machine powertrain of claim 2, wherein one of the second clutch and the forward clutch is engaged and the other of the second clutch and the forward clutch is disengaged when the third clutch is engaged to provide the third forward-motion gear ratio.

4. The machine powertrain of claim 1, comprising:
a reverse output system having a reverse drive gear operatively coupled to the first planetary output, and a reverse output gear operatively connected to the transmission output shaft; and
a reverse clutch connected to the reverse drive gear and configured to releasably engage the reverse output gear to cause the reverse output gear to rotate with the reverse drive gear,
wherein the first clutch and the reverse clutch are engaged to provide a first reverse-motion gear ratio between the transmission input shaft and the transmission output shaft, and the second clutch and the reverse clutch are engaged to provide a second reverse-motion gear ratio between the transmission input shaft and the transmission output shaft.

5. The machine powertrain of claim 4, wherein the reverse drive gear meshes with the first planetary output and the first forward drive gear meshes with the reverse drive gear so that rotation of the first planetary output causes the first forward drive gear to rotate in a forward direction and the reverse drive gear to rotate in a reverse direction.

6. The machine powertrain of claim 1, comprising a supplemental hydraulic motor having a supplemental-motor output gear operatively coupled to the transmission output shaft.

7. The machine powertrain of claim 6, comprising a hydraulic steering pump driven by the transmission input shaft and fluidly coupled to the supplemental hydraulic motor, wherein the hydraulic steering pump and the supplemental hydraulic motor are selectively engaged to increase torque input to the transmission output shaft.

8. A machine powertrain that includes a power source connected to a continuously variable transmission, the continuously variable transmission comprising:
a transmission input shaft driven by the power source;
a variator including a variator input gear driven by the transmission input shaft and a variator output gear;
a planetary gear arrangement having first planetary gear set connected to a second planetary gear set, the first planetary gear set having a first planetary gear arrangement input gear and the second planetary gear set having a second planetary gear arrangement input gear, wherein the first planetary gear arrangement input gear is driven by the transmission input shaft and the second planetary gear arrangement input gear is driven by the variator output gear;
a planetary output shaft having a first planetary output gear;
a forward output system having a first forward drive gear operatively coupled to the first planetary output gear, and a forward output gear operatively connected to a transmission output shaft;
a first clutch connected to a second planet carrier of the second planetary gear set;
a second clutch connected to the first planetary output gear;
a forward clutch connected to the first forward drive gear; and
a controller operatively connected to the variator, the first clutch, the second clutch and the forward clutch, the controller being programmed to:
actuate the first clutch to cause the first planetary output gear to rotate with the second planet carrier and actuate the forward clutch to cause the forward output gear to rotate with the first forward drive gear and provide a first forward-motion gear ratio between the transmission input shaft and the transmission output shaft, and
actuate the second clutch to cause the first planetary output gear to rotate with a second sun gear of the second planetary gear set and actuate the forward clutch to cause the forward output gear to rotate with the first forward drive gear and provide a second forward-motion gear ratio between the transmission input shaft and the transmission output shaft.

9. The machine powertrain of claim 8, wherein the planetary output shaft has a second planetary output gear, wherein the forward output system has a second forward drive gear connected to the forward output gear and operatively coupled to the second planetary output gear, and wherein the machine powertrain comprises a third clutch connected to the second planetary output gear and operatively connected to the controller, the controller being programmed to actuate the third clutch to cause the second planetary output gear to rotate with the second sun gear and provide a third forward-motion gear ratio between the transmission input shaft and the transmission output shaft.

10. The machine powertrain of claim 9, wherein the controller is programmed to disengage one of the second clutch and the forward clutch and actuate the other of the second clutch and the forward clutch when the third clutch is actuated.

11. The machine powertrain of claim 8, comprising:
a reverse output system having a reverse drive gear operatively coupled to the first planetary output gear, and a reverse output gear operatively connected to the transmission output shaft;
a reverse clutch connected to the reverse drive gear and operatively connected to the controller, wherein the controller is programmed to:
actuate the first clutch to cause the first planetary output gear to rotate with the second planet carrier and actuate the reverse clutch to cause the reverse output gear to rotate with the reverse drive gear and provide a first reverse-motion gear ratio between the transmission input shaft and the transmission output shaft, and
actuate the second clutch to cause the first planetary output gear to rotate with the second sun gear and actuate the reverse clutch to cause the reverse output gear to rotate with the reverse drive gear and provide a second reverse-motion gear ratio between the transmission input shaft and the transmission output shaft.

12. The machine powertrain of claim 11, wherein the reverse drive gear meshes with the first planetary output gear and the first forward drive gear meshes with the reverse drive gear so that rotation of the first planetary output gear causes the first forward drive gear to rotate in a forward direction and the reverse drive gear to rotate in a reverse direction.

13. The machine powertrain of claim 8, comprising a supplemental hydraulic motor having a supplemental-motor output gear operatively coupled to the transmission output shaft, wherein the controller is operatively coupled to the supplemental hydraulic motor.

14. The machine powertrain of claim 13, comprising a hydraulic steering pump driven by the transmission input shaft and fluidly coupled to the supplemental hydraulic motor, wherein the controller is operatively coupled to the hydraulic steering pump and is programmed to selectively actuate the hydraulic steering pump and the the supplemental hydraulic motor to increase torque input to the transmission output shaft.

15. A method for providing a plurality of gear ratios between a transmission input shaft and a transmission output shaft of a continuously variable transmission of a machine powertrain that includes a power source, the continuously variable transmission including a variator with a variator input gear driven by the transmission input shaft and a variator output gear, a planetary gear arrangement having first planetary gear set connected to a second planetary gear set, the first planetary gear set having a first planetary gear arrangement input gear and the second planetary gear set having a second planetary gear arrangement input gear, wherein the first planetary gear arrangement input gear is driven by the transmission input shaft and the second planetary gear arrangement input gear is driven by the variator output gear, a planetary output shaft having a first planetary output gear, and a forward output system having a first forward drive gear operatively coupled to the first planetary output gear and a forward output gear operatively connected to the transmission output shaft, the method comprising:
 actuating a first clutch to cause the first planetary output gear to rotate with a second planet carrier of the second planetary gear set and actuating a forward clutch to cause the first planetary output gear to rotate with the first forward drive gear and provide a first forward-motion gear ratio between the transmission input shaft and the transmission output shaft, and
 actuating a second clutch to cause the first planetary output gear to rotate with a second sun gear of the second planetary gear set and actuating the forward clutch to cause the forward output gear to rotate with the first forward drive gear and provide a second forward-motion gear ratio between the transmission input shaft and the transmission output shaft.

16. The method of claim 15, wherein the planetary output shaft has a second planetary output gear, wherein the forward output system has a second forward drive gear connected to the forward output gear and operatively coupled to the second planetary output gear, the method comprising actuating a third clutch to cause the second planetary output gear to rotate with the second sun gear and provide a third forward-motion gear ratio between the transmission input shaft and the transmission output shaft.

17. The method of claim 16, comprising disengaging one of the second clutch and the forward clutch and actuating the other of the second clutch and the forward clutch when the third clutch is actuated.

18. The method of claim 15, wherein the continuously variable transmission includes a reverse output system having a reverse drive gear operatively coupled to the first planetary output gear, and a reverse output gear operatively connected to the transmission output shaft, the method comprising:
 actuating the first clutch to cause the first planetary output gear to rotate with the second planet carrier and actuating a reverse clutch to cause the reverse output gear to rotate with the reverse drive gear and provide a first reverse-motion gear ratio between the transmission input shaft and the transmission output shaft, and
 actuating the second clutch to cause the first planetary output gear to rotate with the second sun gear and actuating the reverse clutch to cause the reverse output gear to rotate with the reverse drive gear and provide a second reverse-motion gear ratio between the transmission input shaft and the transmission output shaft.

19. The method of claim 18, wherein the reverse drive gear meshes with the first planetary output gear and the first forward drive gear meshes with the reverse drive gear so that rotation of the first planetary output gear causes the first forward drive gear to rotate in a forward direction and the reverse drive gear to rotate in a reverse direction.

20. The method of claim 15, wherein the continuously variable transmission includes a hydraulic steering pump driven by the transmission input shaft, and a supplemental hydraulic motor fluidly coupled to the supplemental hydraulic motor and having a supplemental-motor output gear operatively coupled to the transmission output shaft, the method comprising selectively actuating the hydraulic steering pump and the supplemental hydraulic motor to increase torque input to the transmission output shaft.

* * * * *